United States Patent [19]
Frederick et al.

[11] Patent Number: 5,867,258
[45] Date of Patent: Feb. 2, 1999

[54] SYSTEM FOR MULTIPLEXED HIGH RESOLUTION MEASUREMENT OF FREQUENCY VARIATIONS IN MULTIMODE FIBER LASER ACOUSTIC SENSORS

[75] Inventors: Donald A. Frederick, Canoga Park; Steven G. Bell, Woodland Hills, both of Calif.

[73] Assignee: Litton Systems, Inc., Woodland Hills, Calif.

[21] Appl. No.: 958,365

[22] Filed: Oct. 27, 1997

Related U.S. Application Data

[60] Provisional application No. 60/054,347 Jul. 31, 1997.

[51] Int. Cl.$^6$ ........................................................ G01B 9/02
[52] U.S. Cl. ........................ 356/35.5; 356/345; 356/352; 250/227.27; 372/6
[58] Field of Search ................................. 356/345, 352, 356/35.5; 250/227.14, 227.19, 227.27; 385/12, 14; 372/6

[56] References Cited

U.S. PATENT DOCUMENTS 5,513,913  5/1996  Ball et al. ................................. 356/32

OTHER PUBLICATIONS

High resolution fiber grating basedstrain sensor with interferometric wavelength shift detection, Kersey et al, Electronics Letters, 1–1992, pp. 236–238.
Interogation and multiplexing techniques for fiber Bragg grating strain sensors, Kersey, Fiber optic based structural sensing, FALL 1996.
Single–and Multipoint Fiber–Laser Sensors by G. A. Ball, W. W. Morey, and P. K. Cheo, IEEE Photonics Technology Letters, vol. 5, No. 2, Feb. 1993, pp. 267–270.
Multi–Element Bragg–Grating Based Fibre–Laser Strain Sensor by A. D. Kersey and W. W. Morey, Electronics Letters, vol. 29, No. 11, May 27, 1993, pp. 964–966.
A Multiplexed Bragg Grating Fiber Laser Sensor System by A. T. Alavie, S. E. Karr, A. Othonos, and R. M. Measures, IEEE Photonics Technology Letters, vol. 5, No. 9, Sep. 1993, pp. 1112–1114.

*Primary Examiner*—Samuel A. Turner
*Attorney, Agent, or Firm*—Price Gess & Ubell

[57] ABSTRACT

A system for performing high resolution measurement of frequency variations in multimode fiber laser acoustic sensors having an end-pumped active fiber sensor emitting a plurality of lasing modes, wherein precise frequencies of the lasing modes emitted are dependent upon a strain acting on said acoustic sensor. An optical fiber is connected to the active fiber sensor for transmitting the lasing modes. The optical fiber transmits the multiple lasing modes to an optical amplifier fiber where the lasing mode signals are amplified. The amplified lasing modes signals are then fed through a phase modulator connected to the optical fiber for applying a phase generated carrier on the lasing mode signals. The output from the phase modulator is supplied to a receiving interferometer having a predetermined path imbalance for interferometrically analyzing the frequency shifts of each of the lasing mode signals, wherein the predetermined path imbalance is matched with the longitudinal mode spacing between the lasing modes of the active fiber sensor. A demodulation unit is connected to the receiving interferometer for receiving and demodulating the output of the receiving interferometer to determine the frequency shift incurred by the lasing mode signals, wherein the demodulated frequency shift is proportional to the strain acting on the acoustic sensor. In an alternative embodiment, a plurality of active fiber sensors may be pumped by a single laser light source with their outputs multiplexed together and fed through the receiving interferometer for interferometric analysis of all the signals.

11 Claims, 3 Drawing Sheets

SYSTEM FOR MULTIPLEXED HIGH RESOLUTION MEASUREMENT OF FREQUENCY VARIATIONS IN MULTIMODE FIBER LASER ACOUSTIC SENSORS

This application is a continuation of provisional application Ser. No. 60/054,347 filed Jul. 31, 1997 for System for Multiplexed High Resolution Measurement of Frequency Variations in Multimode Fiber Laser Acoustic Sensors.

BACKGROUND OF THE INVENTION

1. Field of the Invention

The present invention relates generally to fiber laser acoustic sensors, and specifically to a system for multiplexed high resolution measurement of frequency variations in fiber laser acoustic sensors.

2. Description of Related Art

Since the development of amplifiers for optical signals, efforts have been made to improve the optical amplifying fiber into which an optical signal to be amplified and pump light are propagated, causing amplification of the optical signal. Such optical amplifying fibers are commonly known as "active" fibers. An active fiber is a fiber doped with one or more of the rare earth family of elements, such as erbium, which generates a light source by introducing an excitation signal into the doped fiber which in turn causes the fiber to emit a light characteristic of the dopant. For discussion purposes, we will describe a fiber doped with erbium, although it is understood that the invention covers a fiber doped with any of the elements which have similar characteristics to those described herein. When erbium is pumped with a laser at the appropriate wavelength, it emits a light in the 1525 to 1560 nanometer (nm) wavelength. When an erbium doped fiber is supplied with a source of energy being pumped into the fiber, such as for example a wavelength of 1480 nm generated by a pumping laser diode, the electrons in the erbium absorb the energy and jump to a higher energy state. This energy may later be released as coherent laser light on which a measurand signal is encoded.

An active sensor is formed by positioning the erbium doped fiber between a pair of wavelength-matched Bragg gratings, where the Bragg gratings reflect a certain wavelength while allowing all other wavelengths to pass through. Thus, a resonant cavity is formed in the doped fiber between the Bragg gratings. The stored energy from the doped fiber is eventually released as a wavelength between 1525 to 1560 nm traveling down the fiber. Active sensors may be used for both strain and temperature measurements, since these elements affect the optical properties of the active sensors. The length of the doped fiber changes in conjunction with changes in temperature and pressure acting on the fiber, which in turn changes the length of the resonant cavity. By changing the length of the resonant cavity, the lasing wavelength of the active sensor similarly changes. The wavelength emitted by the active sensor can be measured to determine the length of the resonant cavity which, in turn, represents the strain acting on the active sensor from the acoustic pressure or temperature.

Active sensors may be formed having either single or multiple longitudinal modes, where the length of the resonant cavity and the doping material used determine the number of modes resulting in an active sensor. Multimode active sensors have longer resonant cavities which make them easier to construct and operate, because more gain is available in the longer resonant cavities and cavity length requirements are not very stringent. The output spectrum of multimode active sensors, however, spans several gigahertz, which degrades the signal-to-noise ratio in readout devices that analyze the active sensor frequency shifts. For high resolution analysis of frequency shifts in an active sensor, it is generally desirable to suppress all but the dominant longitudinal mode. Thus, it is desirable to operate in a single lasing mode with a single frequency emitted. Erbium is typically used in most active sensors, because erbium has a very broad gain bandwidth and will amplify a number of frequencies. The active fiber sensor must be made as small as possible in order to operate with as few as possible wavelengths. To produce a single resonant frequency, the resonant cavity must be very short, resulting in a small amount of erbium or other doping material being present in the cavity. This tends to produce a fairly weak signal that cannot be transmitted over long distances. With an extremely short resonant cavity, a large amount of pump power must delivered to the active sensor to produce a signal from the active sensor strong enough to be transmitted more than a minute distance.

There is a need for a multimode active sensor which does not possess a degraded signal-to-noise ratio associated with the large output spectrum of prior active sensors. Moreover, there is a need for a multimode active sensor allowing for a high resolution analysis of frequency shifts occurring in the active sensor to be obtained similar to that of a single mode active sensor, without suffering the stringent operating and manufacturing requirements of a single mode active sensor.

OBJECTS AND SUMMARY OF THE INVENTION

It is a primary object of the present invention to overcome the aforementioned shortcomings associated with the prior art.

Another object of the present invention is to provide a fiber laser sensor system providing high resolution measurement of frequency variations in multimode active fiber sensors.

Yet another object of the present invention is to provide a system for high resolution measurement of frequency variations in multimode active fiber sensors having a output signal with signal-to-noise ratio characteristics similar to that of a single mode active sensor.

A further object of the present invention is to provide a system for high resolution measurement of frequency variations in multimode active fiber sensors which does not require a large amount of pumping power to be delivered to the active fiber sensors.

It is yet another object of the present invention to provide a system for high resolution measurement of frequency variations in multimode active fiber sensors which does not require stringent construction requirements when forming the length of the active fiber sensors.

These as well as additional objects and advantages of the present invention are achieved by providing a system for performing high resolution measurement of frequency variations in multimode fiber laser acoustic sensors having an end-pumped active fiber sensor emitting a plurality of lasing modes, wherein the precise frequencies of the lasing modes emitted are determined by the strain acting on said acoustic sensor. An optical fiber is connected to the active fiber sensor for transmitting the lasing modes. The optical fiber transmits the multiple lasing modes to an optical amplifier fiber wherein the lasing mode signals are amplified. The amplified lasing modes signals are phase modulated on a carrier by a phase modulator connected to the optical fiber. The phase modulated carrier is supplied to a receiving interferometer having a predetermined path imbalance for generating a phase shift in each of the lasing mode signals, wherein the predetermined path imbalance is matched with the longitudinal mode spacing between the lasing modes of the active fiber sensor. A demodulation unit is connected to the receiving interferometer for demodulating the output of the receiving interferometer to determine the phase shift of the interferometer intensity pattern. The demodulated phase shift is a representation of the strain acting on the acoustic sensor.

In an alternative embodiment, a plurality of active fiber sensors may be pumped by a single laser light source with their outputs multiplexed together. All of the output signals from the multiple active fiber sensors 16 are multiplexed onto a single optical fiber. All of the signals are then amplified by a single, laser-pumped optical amplifier. Other similar optical fibers carrying a similar assortment of wavelength division multiplexed signals may be provided. Each of the optical fibers is routed through a phase modulator to have its respective signals modulated with a different phase generated carrier frequency. All of the optical fibers are coupled together and fed into a receiving interferometer, where the output of receiving interferometer contains signals from all active fiber sensors, each sensor having a unique combination of wavelength and phase generated RF subcarrier frequency. The output of the receiving interferometer may be fed through an optical isolator before being run through an optical coupler having output leads leading to demultiplexing/demodulation units. Each output lead can have all signals of a given wavelength picked off and fed into a respective demultiplexing/demodulation unit using Bragg gratings matched with those in the active fiber sensors. The wavelength filtered outputs are then photodetected and mixed with the appropriate RF subcarrier frequency in the demultiplexing/demodulation unit for the final demultiplexing and demodulation of the signals.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a simplified system for the high resolution measurement of frequency variations in multimode fiber laser acoustic sensors having an improved signal-to-noise ratio in their output.

Figure 1:
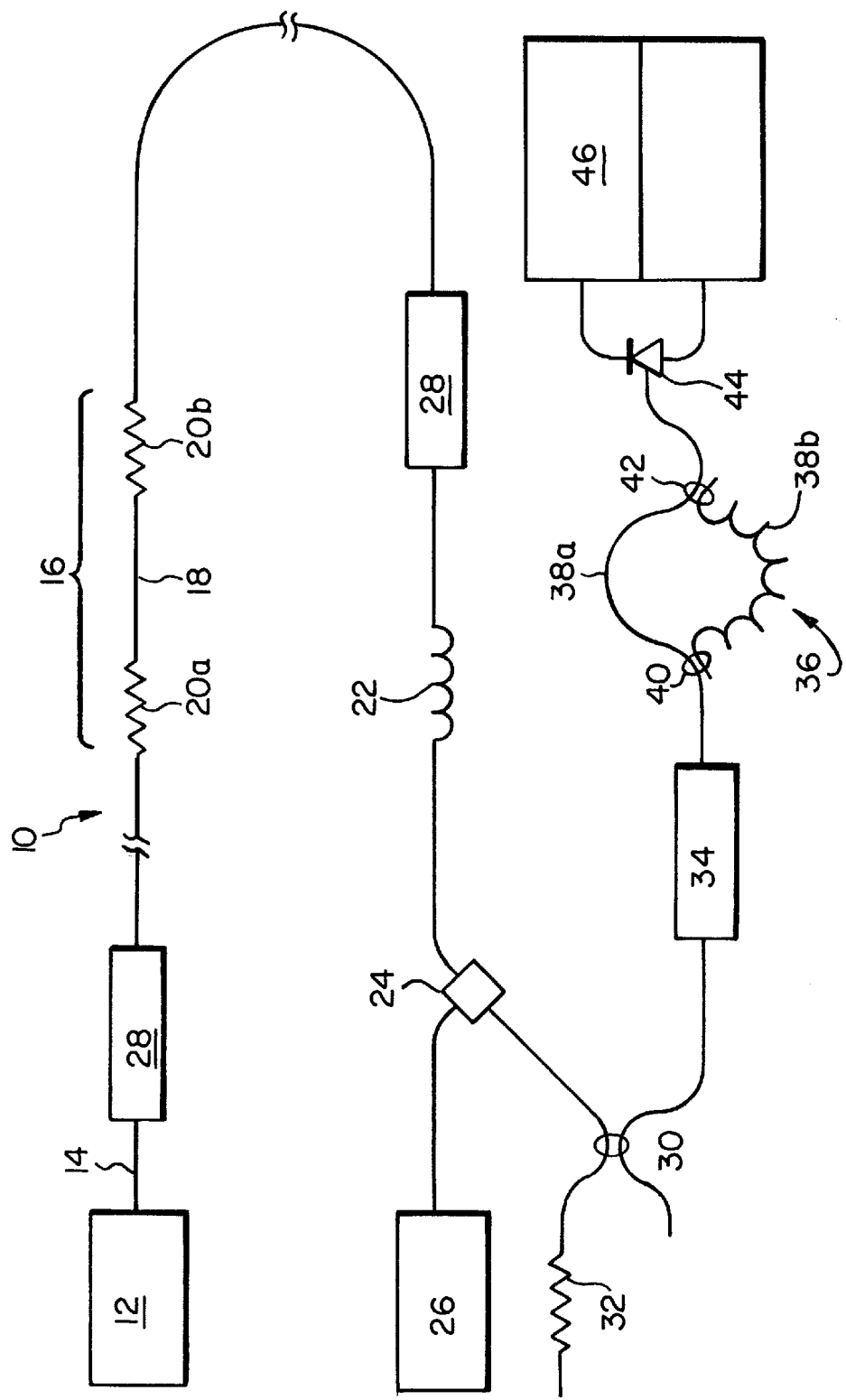
FIG. 1 is a schematic illustration of a preferred embodiment of a system for high resolution measurement of frequency variations in multimode active fiber sensors in accordance with a preferred embodiment of the present invention.

Referring now to FIG. 1, a schematic layout of a preferred embodiment of a fiber laser sensor system 10 of the present invention is illustrated. The fiber laser sensor system 10 includes a laser light source 12 which generates a pumping light signal and emits the light signal into an optical fiber 14. Laser light source 12 is preferably a pumping laser diode generating a light wavelength of 1480 nanometers (nm). Other similar illumination devices may be utilized. The light signal traverses along the optical fiber 14 to an active fiber sensor 16. The active fiber sensor 16 includes a length of optical fiber 14 resting between two Bragg gratings. A portion of this length 18 is doped with an element from the rare earth family, such as erbium. While the doping medium used in active fiber sensor 16 is being described as Erbium, it is understood that doping medium from the other elements of the rare earth family may be utilized. Active fiber sensor 16 further includes a pair of matched Bragg gratings 20a and 20b positioned on opposite sides of doped fiber portion 18.

When optically pumped by the light traversing from laser light source 12, the doped fiber portion 18 lases in a narrow bandwidth within the wavelength band of Bragg gratings 20a and 20b. Doped fiber portion 18 provides a resonator cavity between Bragg gratings 20a and 20b for the lasing wavelengths to propagate and interfere with themselves. The length of doped fiber portion 18, and thus the resonator cavity, is formed to be an integer multiple of the number of wavelengths of light lasing within the cavity so that the lasing wavelengths interfere constructively. The erbium-doped fiber portion 18 will absorb the specific wavelength emitted from laser light source 12, which is 1480 nm in the preferred embodiment, and tend to fluoresce at wavelengths near 1.55 microns. Bragg gratings 20a and 20b cause periodic disturbance in the lased wavelength, where each disturbance reflects a little bit of light. The reflections from these disturbances are all in phase, so that they interfere constructively and the lasing wavelength is largely reflected. The Bragg gratings thereby act as mirrors which form a resonating cavity. The wavelengths which are resonant in the cavity (by virtue of the round-trip path through the cavity being an integral multiple of such wavelengths) will then stimulate laser radiation, at the resonant wavelengths, to be emitted from the doped fiber.

As the length of the resonant cavity is changed, a different wavelength is amplified. Since the length of the resonant cavity is congruent with the length of doped fiber portion 18, the length of doped fiber portion 18 determines the wavelength to be emitted by active fiber sensor 16. Doped fiber portion 18 is pressure sensitive, in that its length changes with the strain acting on it. Thus, strain from changes in pressure, acoustics, or temperature will change the length of doped fiber portion 18 and, in turn, change the wavelengths resonant in the cavity formed by the two Bragg gratings 20a and 20b, which in turn changes the wavelengths of the stimulated laser emission. The wavelengths output by active fiber sensor 16 will have the acoustical pressure encoded on them. The wavelengths generated by active fiber sensor 16 can be analyzed to determine the length of doped fiber portion 18, which will indicate the amount of strain acting on doped fiber portion 18. This allows acoustic pressure acting on the active fiber sensor 16 to be determined by analyzing the emitted wavelengths. Doped fiber portion 18 may be further positioned around a pliant structure, such as a cylinder, to increase the sensitivity of doped fiber portion 18 to strain. The frequency variation of the wavelength lasing within active fiber sensor 16 is proportional to the strain on the doped fiber portion 18, which is proportional to the acoustic pressure.

While the bandwidth of light lased by the active fiber sensor 16 will vary with the doping material used and the length of the doped fiber portion 18, erbium has a very broad gain bandwidth and it will amplify a large number of wavelengths. Therefore, doped fiber portion 18 must be made as small as possible in order to minimize the number of wavelengths emitted by active fiber sensor 16. Operating active fiber sensor 16 with a single lasing mode emitted would provide the optimal signal-to-noise ratio for the lased wavelength. However, as described in connection with the prior art active sensors, in order to operate with a single lasing mode, an extremely short resonant cavity with a large amount of pumping power from the pumping laser diode is required. Rather than operate under such stringent operating conditions, the present invention uses a length of doped fiber portion 18 which produces a plurality of lasing modes while preventing too large of an output spectrum from being produced. As described in greater detail hereinbelow, the fiber laser sensor system 10 of the present invention utilizes a novel technique of analyzing multiple lasing modes produced by the active fiber sensor 16 while maintaining a signal-to-noise quality equivalent to that of a single mode output.

Doped fiber portion 18 is constructed having an amount of erbium sufficient to support multiple longitudinal modes or frequencies while being short enough to prevent too many longitudinal modes from being produced. The amount of erbium present in the doped fiber portion 18 is limited by the length of the doped fiber portion 18. It is object of the present invention to eliminate the need to supply a large amount of pumping power into the doped fiber portion 18, even with a limited amount of erbium present therein.

The output of active fiber sensor 16 will not be strong enough to travel large distances. So, the output of active fiber sensor 16 is fed through an optical amplifier 22 to increase the strength of wavelength signals output from active fiber sensor 16. A wavelength division multiplexing (WDM) coupler 24 may be positioned along optical fiber 14 in order to propagate pump light from a pumping laser diode 26 with the optical signal through optical fiber 14. The WDM coupler 24 couples the pump light from pump laser diode 26 onto optical fiber 14. Doped fiber portion 22 of fiber 14 can then amplify the laser light from the active laser sensors for transmission over great distances. An optical isolator 28 may also be used at either end of optical amplifier 22 in order to avoid amplification of back reflections.

The optical signal output from optical amplifier 22 is fed through optical fiber 14 to a coupler 30, such as a 1×2 fiber coupler, having a Bragg grating 32. Bragg grating 32 is frequency matched with Bragg gratings 20a and 20b in active fiber sensor 16, so that only the frequencies emitted by the active fiber sensor 16 are reflected back through optical coupler 30. Optical coupler 30 and Bragg grating 32 serve as an amplified spontaneous emission filter, where only the Bragg wavelength is reflected through optical coupler 30. The optical signal reflected from Bragg grating 32 is fed to an electro-optic phase modulator 34, which applies a phase generated carrier to the optical signal. The signal is then fed to a receiving interferometer 36, which has been made insensitive to environmental disturbances, having a predetermined path imbalance between its legs 38a and 38b. Receiving interferometer 36 divides the optical signal into two equal parts with a optical splitter 40, such as a 3 dB splitter or Y splitter. A phase shift in the optical signal is introduced into leg 38b relative to the optical signal in leg 38a, since leg 38b is formed to be longer than leg 38a with a larger number of wavelengths propagating in leg 38b. The two optical signals traveling through legs 38a and 38b are combined at optical coupler 42, which is similar to optical splitter 40. Depending upon the phase shift in the optical signal traveling through leg 38b, the combined optical signals will either interfere constructively or destructively. Because of the length mismatch between the two legs of the interferometer, the intensity produced by the interference of the combined optical signals is sensitive to the wavelength of the fiber laser sensor signals. As the relative phase shift between the signals in legs 39a and 38b varies over $2\pi$, the intensity in the fiber exiting the receiving interferometer will go through a cycle, displaying a maximum and a minimum intensity. The path imbalance between the legs 38a and 38b is made very large so that receiving interferometer 36 is very sensitive to small changes in wavelength output by active fiber sensor 16 as it changes with changes with acoustic pressure. The output of the receiving interferometer 36 is photodetected by a photodiode 44 and fed into an optical receiver/demodulation unit 46 where the optical signal is processed.

The path imbalance between the legs 38a and 38b of the receiving interferometer 36 is large enough that the noise in the demodulated fringe phase output of the receiving interferometer 36 is dominated by the frequency jitter of the optical signal traveling from active fiber sensor 16, as amplified by optical amplifier 22. The fiber laser sensor system 10 set forth hereinabove may be used to measure an acoustic pressure acting on it. An acoustic signal impinging on the active fiber sensor 16 imposes a longitudinal strain on the doped fiber portion 18 proportional to the acoustic pressure. This longitudinal strain changes the length of doped fiber portion 18 and, thus, the resonant cavity of the active fiber sensor 16. Since the lasing frequency is inversely proportional to the length of the resonant cavity, the lasing frequency changes with the longitudinal strain imposed on doped fiber portion 18. The change in lasing frequency can be determined by the demodulated fringe phase output from the receiving interferometer 36, where the demodulated fringe phase is proportional to the acoustic pressure imposing on doped fiber portion 18. The large imbalance in the path lengths of legs 38a and 38b provides an interference fringe pattern which is sensitive to the wavelength used to interrogate it. The interferometer is kept stable over times comparable to the periods of acoustic oscillations being measured, while changes in the wavelength of the longitudinal modes output by active fiber sensor 16 change the intensity of the wavelength passing through receiving interferometer 36.

While active fiber sensor 16 may be formed to operate with a single longitudinal mode or multiple longitudinal modes, it is far easier to construct and operate multimode active fiber sensors due to the less stringent cavity length control requirements and more gain being available in the longer cavities. However, the large output spectrum of prior multimode fiber sensor devices caused a degraded signal-to-noise ratio in sensing devices analyzing the fiber sensor frequency shifts. The inventors of the present invention have developed a manner of operating with multiple longitudinal modes without degrading the signal-to-noise ratio of the output of the active fiber sensor 16. Because of the requirement that the lasing modes each have an integral number of wavelengths in the resonant cavity, the frequency differences between successive longitudinal modes will all be equal. The path imbalance between the legs 38a and 38b of receiving interferometer 36 is matched with the longitudinal mode spacing (or frequency spacing) between the longitudinal modes output by active fiber sensor 16 in order to minimize noise in the signals.

As described above, the path imbalance in receiving interferometer 36 will generate a phase shift in the optical signal passing therethrough, where each of the multiple longitudinal modes output by active fiber sensor 16 will incur a phase shift. The phase shift or fringe phase φ varies with the longitudinal mode frequency as follows:

$$\phi = 2\pi\tau\delta,$$

where τ is the path imbalance between the legs 38a and 38b of receiving interferometer 36 in seconds of light transmit time, and δ is the longitudinal mode frequency in Hertz. The multiple optical frequencies (i.e., longitudinal modes) output by active fiber sensor 16 are equally spaced apart from one another. τ is adjusted to ensure the phase shift φ between the fringe patterns of different longitudinal modes is an integral multiple of 2π, resulting in the output of the receiving interferometer 36 to behave as if it is derived from a single optical frequency with a linewidth equal to a single mode's linewidth. This is accomplished by making the path imbalance between the legs 38a and 38b of receiving interferometer 36 an integral multiple of the round-trip resonant cavity length of active fiber sensor 16, which is twice the length of doped fiber portion 18. Thus, the multimode active fiber sensor 16 of the present invention provides a signal-to-noise ratio in its output similar to that of a single mode sensor while also having an enhanced sensitivity to frequency variations.

An example showing the results obtained by the fiber laser sensor system 10 of the present invention will now be set forth in greater detail. This example is described merely for the purpose of illustration and does not encompass all possible settings with which the present invention may be operated.

EXAMPLE 1

Figure 3:
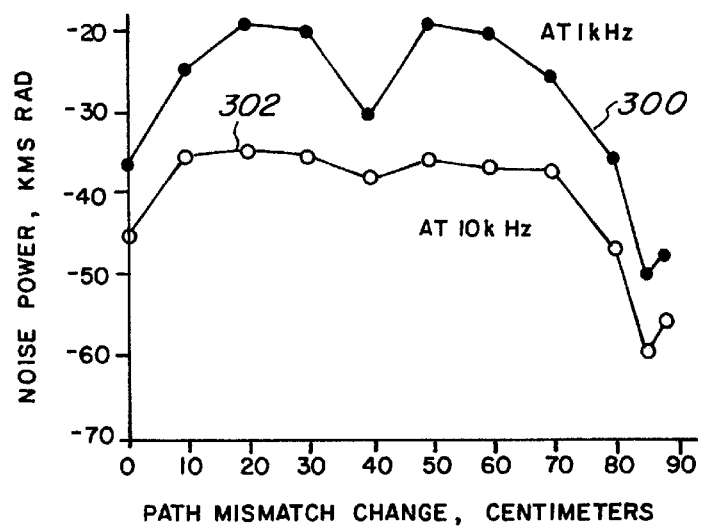
FIG. 3 is a graphical representation of the phase noise power seen at the demodulator as a function of the path imbalance in the interferometer.

Reports of the mode structure of linear fiber lasers generally indicate that cavity lengths of 3–5 centimeters and pump powers of 80 mW at 980 nm are necessary to obtain single mode lasing, as taught in the article "Single and Multipoint Fiber-Laser Sensors" by Ball et al., *IEEE Photonics Technology Letters*, Feb. 1993, vol. 5, no. 2. The present invention used a doped fiber portion 18 having a length of 40 cm, resulting in a longitudinal mode spacing of approximately 250 MHz between longitudinal modes. The RF spectrum of the active fiber sensor 16 output indicated intermodal beats out to 1.5 GHz, showing that at least 6 modes were generated by active fiber sensor 16. By adjusting the path imbalance τ to ensure the phase shift φ between the fringe patterns of the different longitudinal modes was an integral multiple of 2π, the noise of the phase demodulator was minimized. For a longitudinal mode spacing of 250 Mhz in the present example, the path imbalance τ should be multiple of 82 cm in order to be matched with the longitudinal mode spacing. A path imbalance of 820 cm is sufficient to cause laser frequency jitter to set the system noise floor level, meaning that tolerances on the receiving interferometer 36 path imbalance and doper fiber portion 18 length are on the order of approximately one centimeter, in order to maintain the proper phase relationship among all the interference signals from the different longitudinal modes. In the present example, the path imbalance was set at near 80 meters. The phase noise from the demodulator as a function of path imbalance is illustrated in FIG. 3 as the path mismatch was trimmed over a range of 87 cm. Line 300 shows the interferometer phase noise in RMS radians at 1 kHz as a function of path mismatch, while line 302 shows the phase noise in RMS radians at 10 kHz as a function of path mismatch. As seen in FIG. 3, two minima in phase noise were observed near the extremes of this range of path imbalances. The demodulator output was controlled by an AGC circuit that maintained a constant signal level, where a higher noise floor resulted from using an increased AGC gain to compensate for lower signal levels. The signal level drops with fading fringe contrast caused by having the fringe patterns of the various longitudinal modes out of phase with one another. Therefore, the rising noise floor represents a degraded signal-to-noise ratio.

Figure 4:
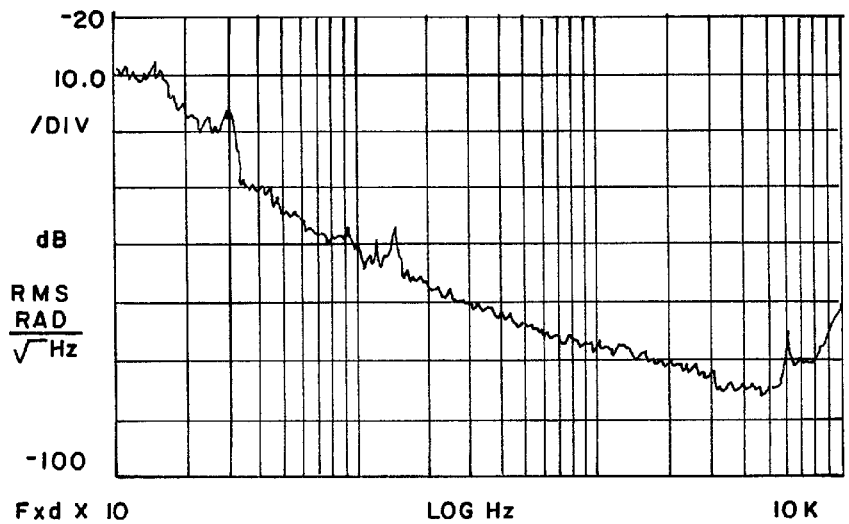
FIG. 4 is a graphical representation of a nose floor for the active fiber sensor of the present invention.

The performance of the fiber laser sensor system 10 of Example 1 will be further described with reference to FIGS. 4 and 5. FIG. 4 illustrates the sensor noise floor as a logarithmic function of frequency. The interferometer phase noise for the 80 meter mismatch receiving interferometer 36 at 1 kHz was observed to be −78 dB re rad/√Hz. This equates to a laser frequency noise of approximately 50 Hz/√Hz. Since the fractional frequency change is equal to the fractional length change in the active fiber sensor 16, the minimum detectable strain signal of the active fiber sensor 16 can be determined by dividing the sensor noise frequency by the optical frequency. Thus, the minimum detectable strain signal at 1 kHz is equal to $50 \div 1.95 \times 10^{14} \approx 2.6 \times 10^{-13}$, or 0.26 picostrain. This degree of sensitivity of the active fiber sensor 16 is among the highest sensitivity yet reported.

Figure 5:
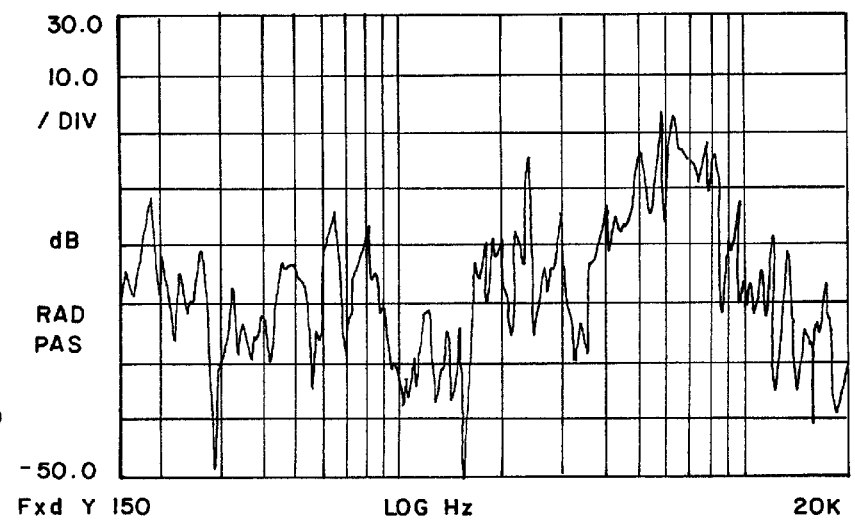
FIG. 5 is a graphical representation of an acoustic scale factor for the active fiber sensor of the present invention.

FIG. 5 illustrates the acoustic scale factor of the active fiber sensor 16, measured in air, of roughly −20 dB re Rad/Pa. Due to the non-optimized packaging of the bare fiber hanging in air, the acoustic scale factor was somewhat nonlinear. The noise density divided by this scale factor presents a minimum detectable acoustic signal of −58 dB re Pa/√Hz, or 1¼ millipascal in a one Hertz band at 1 kHz. The acoustic sensitivity could be improved further by optimized jacketing and packaging of the sensing fiber.

Figure 2:
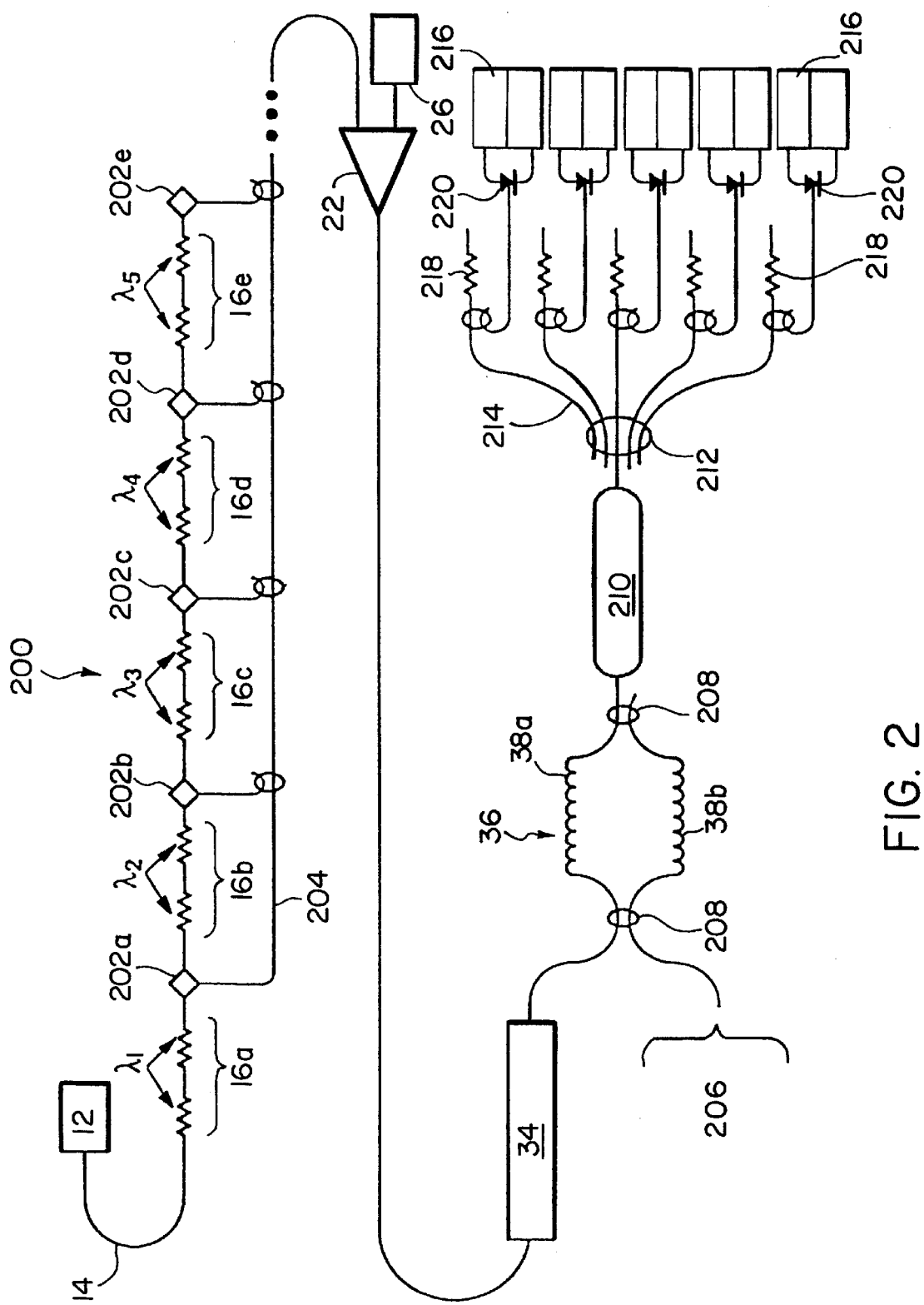
FIG. 2 is a schematic illustration of an alternative embodiment of the system for multiplexed high resolution measurement of frequency variations in multimode active fiber sensors in accordance with the present invention.

In an alternative embodiment of the present invention, a plurality of active fiber sensors 16 may be pumped by a single laser light source 12 and multiplexed together, as illustrated by the fiber laser sensor system 200 in FIG. 2. Reference numerals similarly numbered as those in FIG. 1 designate like components, and a recounting of their function will be omitted from the description of this embodiment. The reflection bandwidth of the Bragg gratings 20a and 20b within each active fiber sensor 16 is approximately a nanometer, where light outside of this bandwidth passes through the Bragg gratings 20a and 20b undisturbed. The active fiber sensors 16 can operate under any number of wavelengths, since the erbium doped fiber portion 18 can support wavelengths spanning approximately 40 nanometers. Thus, a few tens of active fiber sensors 16 can operate on the same fiber without producing crosstalk or intermodulation among themselves, depending upon the number of longitudinal modes generated by each active fiber sensor 16.

Laser light source 12 pumps active fiber sensor 16a to emit an optical signal centered about a wavelength $\lambda_1$. The output of active fiber sensor 16a is fed through a wavelength division multiplexing (WDM) coupler 202a where optical signal $\lambda_1$ is coupled off of optical fiber 14 and onto a return telemetry optical fiber 204. WDM coupler 202a allows the pump light at a different wavelength from $\lambda_1$, to proceed to the adjacent active fiber sensor 16b. Active fiber sensor 16b will emit an optical signal centered about a wavelength $\lambda_2$, which is coupled off of optical fiber 14 and onto a return telemetry optical fiber 204 by another WDM coupler 202b. WDM coupler 202b allows the pump light at a different wavelength from $\lambda_2$ to proceed to the adjacent active fiber sensor 16c. This process repeats through the entire succession of active fiber sensors 16 until all of their outputs are coupled onto optical fiber 204. Alternatively, the output of active fiber sensors 16 may be directly transmitted through successive active fiber sensors 16 without branching off the different wavelengths emitted by the active fiber sensors 16 onto a separate optical fiber. The decision of whether to use a separate return telemetry optical fiber 204 can be chosen based on the observed effects of absorption (or gain) of one sensor's signals by succeeding sensors and the acceptable losses incurred in effecting the coupling to the separate optical fiber 204.

No matter which WDM technique is used, all of the output signals from the multiple active fiber sensors 16 will be on a single optical fiber 204. All of the signals may amplified by a single, laser-pumped optical amplifier 22. The fiber laser sensing system 200 may also include other similar optical fibers 206 carrying a similar assortment of wavelength division multiplexed signals as optical fiber 204. Before being fed through receiving interferometer 36, each of the optical fibers 204 and 206 is routed through a phase modulator 34 to have its respective signals modulated with a different phase generated carrier frequency. Optical fibers 204 and 206 are coupled together with a 1×N optical coupler 208, where N is the number optical fibers 204 and 206 entering optical coupler 208 and 1/N of each fiber's signals appear on an output lead fed into receiving interferometer 36. The output of receiving interferometer 36 contains signals from all active fiber sensors 16, each sensor having a unique combination of wavelength and phase generated RF subcarrier frequency. The output of the receiving interferometer 36 may be fed through an optical isolator 210 before being run through a 1×N optical coupler 212, similar to optical coupler 208, with N output leads 214 leading to demultiplexing/demodulation units 216. Each output lead 214 can have all signals of a given wavelength picked off and fed into a respective demultiplexing/demodulation unit 216 using Bragg gratings 218 matched with those in active fiber sensors 16. The wavelength filtered outputs are then photodetected by photodetectors 220 and mixed with the appropriate RF subcarrier frequency in the demultiplexing/demodulation unit 216 for the final demultiplexing and demodulation of the signals.

The amount of multiplexing that can be accomplished with a fiber laser sensor system 200 is limited by the N-squared loss associated with multiplexing through the receiving interferometer 36, as well as the extra noise associated with amplifying the signals on the optical fibers 204 and 206 to a level needed to deal with this loss. It is desirable to have as few receiving interferometers as possible because of the environmental isolation they require to avoid putting environmental noise on the sensor signals. The design of the fiber laser sensor system 200 of the present invention allows 20–40 different wavelengths to be used on a single optical fiber, and 10–20 different subcarrier frequencies are also capable of being used in fiber laser sensor system 200. Thus, a single receiving interferometer 36 can process hundreds of sensor signals.

As can be seen from the foregoing, an active fiber sensor formed in accordance with the present invention will achieve a high resolution measurement of frequency variations in multimode fiber laser sensors. Moreover, by forming a system for multiplexed high resolution measurement of frequency variations in multimode fiber laser sensors in accordance with the present invention, the output of the fiber laser acoustic sensors will have the optimal signal-to-noise characteristics equivalent to that of a single mode sensor without the detrimental large pump power and small cavity required for single mode sensors.

In each of the above embodiments, the different positions and structures of the fiber laser sensor system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for performing high resolution measurement of frequency variations in multimode fiber laser acoustic sensors, comprising:

an end-pumped fiber laser emitting a plurality of lasing modes, wherein the frequencies of said lasing modes emitted are determined by the strain acting on said laser;

an optical fiber connected to said fiber laser for transmitting said lasing modes;

an amplifier means connected to said optical fiber for amplifying said lasing modes;

a phase modulator connected to said optical fiber for phase modulating a carrier on said lasing modes;

a receiving interferometer having a given path imbalance connected to said phase modulator through said optical fiber for generating interference fringes between portions of said lasing modes, wherein said portions have phase delays with respect to one another; and sensing means connected to said receiving interferometer through said optical fiber for demodulating the fringe phase of said interference fringes, wherein said demodulated fringe phase is proportional to the strain acting on said fiber laser.

2. The system for performing high resolution measurement of frequency variations in multimode fiber laser acoustic sensors of claim 1, wherein said receiving interferometer is a pressure insensitive interferometer and said path imbalance is matched with an integral multiple of a round-trip cavity length of said laser fiber so that each of said phase shifts between fringe patterns of different lasing modes are an integral multiple of $2\pi$ from one another and all said phase shifts for said lasing modes are in phase with one another.

3. The system for performing high resolution measurement of frequency variations in multimode fiber laser acoustic sensors of claim 2, wherein a signal-noise ratio of the output of said receiving interferometer for all of said plurality of lasing modes is similar to a signal-to-noise ratio achieved by interrogating said receiving interferometer with a single mode.

4. The system for performing high resolution measurement of frequency variations in multimode fiber laser acoustic sensors of claim 1, wherein said end-pumped fiber laser includes an erbium-doped optical fiber situated between two Bragg gratings.

5. The system for performing high resolution measurement of frequency variations in multimode fiber laser acoustic sensors of claim 1, further comprising:

at least one additional fiber laser emitting a plurality of lasing modes; and a plurality of Bragg gratings connected between said receiving interferometer and said sensing means, wherein each of said Bragg gratings allows only a signal of a given wavelength associated with a respective fiber laser to be transmitted to said sensing means.

6. The system for performing high resolution measurement of frequency variations in multimode fiber laser acoustic sensors of claim 5, wherein each of said Bragg gratings is frequency matched with a respective fiber laser.

7. The system for performing high resolution measurement of frequency variations in multimode fiber laser acoustic sensors of claim 1, further comprising:

at least one additional fiber laser emitting a plurality of lasing modes with an optical fiber connected thereto for transmitting said lasing modes; and a phase modulator respectively connected to each additional optical fiber for phase modulating a carrier frequency on said lasing modes; wherein said carrier frequency phase modulated on lasing modes on each optical fiber is different from the carrier frequency phase modulated on all other optical fibers.

8. The system for performing high resolution measurement of frequency variations in multimode fiber laser acoustic sensors of claim 7, further comprising an optical coupler for coupling each of said optical fibers together so that all of said phase modulated lasing modes from all of said fiber lasers are transmitted along a single output lead, wherein said single output lead is fed into said receiving interferometer.

9. The system for performing high resolution measurement of frequency variations in multimode fiber laser acoustic sensors of claim 8, wherein said sensing means is able to electronically discriminate between the different fiber lasers based upon their respective carrier frequency.

10. The system for performing high resolution measurement of frequency variations in multimode fiber laser acoustic sensors of claim 7, wherein each optical fiber includes at least one additional fiber laser lasing at a different wavelength, so that each optical fiber carries a plurality of wavelengths at a unique carrier frequency.

11. The system for performing high resolution measurement of frequency variations in multimode fiber laser acoustic sensors of claim 10, further comprising:

a second optical coupler positioned between said receiving interferometer and said sensing means for branching off the output of said receiving interferometer onto a plurality of output leads; and a plurality of Bragg gratings connected between said output leads and said sensing means, wherein each output lead has a Bragg grating respectively connected thereto for branching off a distinct lasing wavelength to be transmitted to said sensing means, wherein said sensing means is able to electronically discriminate between the different fiber lasers based upon their respective carrier frequency.

* * * * *